(12) United States Patent
Kalfhaus (10) Patent No.: US 6,181,586 B1
(45) Date of Patent: Jan. 30, 2001

(54) CURRENT-TO-VOLTAGE CONVERTER AND ASSOCIATE CLOSED-LOOP CONTROL CIRCUIT

(76) Inventor: Reinhard Kalfhaus, Johnstrasse 2, 63533 Mainhausen (DE)

( * ) Notice: Under 35 U.S.C. 154(b), the term of this patent shall be extended for 0 days.

(21) Appl. No.: 09/580,956

(22) Filed: May 30, 2000

Related U.S. Application Data

(62) Division of application No. 09/224,835, filed on Jan. 4, 1999, now Pat. No. 6,094,366.

(30) Foreign Application Priority Data

Jan. 5, 1998 (DE) ............................... 198 00 105

(51) Int. Cl.$^7$ .................................................. H02M 7/00
(52) U.S. Cl. ................................................................ 363/73
(58) Field of Search .................................. 363/15, 16, 65, 363/71, 73, 95, 97, 131

(56) References Cited

U.S. PATENT DOCUMENTS 4,581,692 * 4/1986 Nayberg et al. ....................... 363/17
4,779,185 * 10/1988 Musil .................................... 363/73

* cited by examiner

*Primary Examiner*—Matthew Nguyen
(74) *Attorney, Agent, or Firm*—Dennison, Scheiner, Schultz & Wakeman (57) ABSTRACT

The invention relates to a current-to-voltage converter comprising an input connected to a first inductance, a capacitor and a diode, an isolation transformer in connection with a first connection of a primary winding, a second connection is connected with a first output, a breaker circuit is connected over to a connecting point between the first inductance and the capacitor, a series circuit of a second inductance and a measuring element is connected over a connecting point between the capacitor and the diode. The isolation transformer further comprises a plurality of secondary windings on one core in order to form multiple outputs.

7 Claims, 4 Drawing Sheets

CURRENT-TO-VOLTAGE CONVERTER AND ASSOCIATE CLOSED-LOOP CONTROL CIRCUIT

This application is a divisional of U.S. application Ser. No. 09/224,835, filed Jan. 4, 1999 now U.S. Pat. No. 6,094,366.

BACKGROUND OF THE INVENTION

The invention herein relates on one hand to a current-to-voltage converter, in particular for high input voltages, with a primary side, which comprises several serially connected partial systems including, respectively, at least one transistor circuit breaker and at least one separate associate transformer primary winding, and with a secondary side, over which the partial systems are coupled into a common load output, and relates on the other hand relates to a current-to-voltage converter, in particular for high input currents, with a primary side, which comprises several parallel connected partial systems including, respectively, at least one transistor circuit breaker and at least one separate associate transformer primary winding, and with a secondary side, over which the partial systems are coupled into a common load output, and further relates to an associate closed-loop control circuit comprising a voltage regulator with voltage comparator and voltage amplifier and comprising a current regulator with current comparator and current amplifier, as well as a correction member located between the voltage regulator and the current regulator.

In the case of voltage converters for high alternate input voltages or direct voltage as known from prior art, a peak value of the rectified voltage is impressed on a high-capacity capacitor located directly at the outputs of a rectifier. Consequently, very expensive charge circuits with pre-charging capability had to be implemented, for example, by including a resistor and subsequent bridging with ground contacts.

Also, so-called "double-booster" topologies have been known; these comprise an intermediate circuit including with an electrolyte capacitor in such a manner that the latter or the upstream mains is subjected to a load when the high input voltage is impressed due to the feedthrough, without short circuit limit. Therefore, this capacitor must be configured for the peak voltage at the input, whereby this peak voltage is greater than the booster's regulated output voltage.

Furthermore, in controlling high input voltages and currents, problems occur concerning the components used. The semiconductors such as transistors and diodes used must be adapted to the maximum input voltage or current, and the transformers used must be adapted from the viewpoints of power, as well as voltage, to the input voltage to be processed, whereby unacceptable winding and coil voltages occur.

In the case of known converters, which use power transistors as switching elements, the permissible input voltage is limited by the load capability of the type of power transistor used. When several synchronously clocked transistors are connected in series and/or parallel, the problem of voltage and/or current balancing arises, one example of this being the connection of loss-prone RCD line branches parallel to the transistor break distance.

DE 4,414,677 A1 has suggested a primary switched voltage converter with a primary side composed of several serially connected partial systems, each including a transistor circuit breaker arrangement, whereby each of these systems is associated with a separate transformer primary winding, which, in turn, are coupled into a common load output over the secondary side of the converter. Due to the transformer winding voltage, this coupling effects automatic, dynamic and quasi loss-free voltage balancing between the partial systems under load.

In the case of this form of embodiment the transformer windings are connected "hard" parallel on the secondary side. This has the disadvantage that the absence of balances results in dynamic circulating currents—which are not current-limiting—but effect balancing.

Also this circuit layout has the disadvantage that, in the case of converters with alternating current input, a peak value of the rectified voltage is impressed directly on a high-capacity capacitor located directly at the output of a rectifier and that all of these flow-through converter topologies do not permit a power take-up (Power Factor Correction=PFC) adapted to the waveform of the input voltage.

SUMMARY OF THE INVENTION

Therefore, the problem to be solved by the invention herein provides a converter for high input voltages or input currents, said converter having a simple design and improving voltage or current balancing.

In accordance with the invention herein, this problem has been solved in the case of a converter, in particular for high input voltages, in that each of the serially connected partial systems comprises a branch with input-side inductance and at least one transistor circuit breaker, whereby the inductances are applied, at least temporarily, over the corresponding transistor circuit breaker electrically in series the input voltage and result in voltage balancing between the partial systems, and whereby one output of each of the partial systems is connected with the respective transformer primary winding acting as isolating transformer for power supply.

In accordance with the invention herein, this problem has been solved in the case of a converter, in particular for high input currents, in that each of the parallel connected partial systems comprises a branch with an input-side inductance and at least one transistor circuit breaker which, at least temporarily, is connected electrically parallel to input voltage $U_E$ and thereby balances the currents between the partial systems, and that respectively one output of the partial systems is connected with respectively one transformer primary winding acting as isolating transformer for power supply.

As opposed to known systems, this topology results in the supply of power into the transformer. This means that each primary winding transmits its current in a flow-through manner and hence impresses it on the secondary load.

By time-synchronized activation of all transistor circuit breakers, each partial system works with a partial voltage or partial current, which is obtained by dividing the input voltage $U_E$ or the input current IE by the number N of the serially or parallel connected partial systems. In so doing, commercially available components can be used for the layout of the transistor circuit breakers, as well as for the layout of inductances such as reactance coils and isolating transformers, whereby these components need not comply with high-voltage requirements. This reduces costs considerably. When compared with prior art, the essential difference is that voltage and/or current are balanced over the input-side inductance or primary-side inductance or reactance coil of the corresponding partial system. Provided that all reactance coils, which are temporarily connected in series or parallel, exhibit the same inductance and synchronous activation is ensured, on one hand a proportional voltage drop occurs on each reactance coil carrying a current for a certain period of time, when the connection is in series, so that also the voltage applied over the circuit elements corresponds to a Nth portion of the input voltage $U_E$, and on the other hand a proportional current drop occurs, when the connection is parallel, so that current flowing through the circuit elements corresponds to a $N^{th}$ portion of the input current.

In a particularly preferred embodiment the partial systems are configured as SEPIC converters or regenerators, whereby at least one converter, preferably the reference (connected to ground) converter, is connected with only one closed-loop control circuit, the output signal of which is supplied to a trigger circuit associated with all transistor circuit breakers.

In another particularly preferred embodiment the closed-loop control circuit includes a circuit, which is connected to line voltage for the detection of line voltage and/or line frequency, and sends corresponding signals to the closed-loop control circuit, whereby the voltage converter functions either as DC converter or as AC converter with PFC analysis, depending on the input voltage. By using a mains-connected detector, the voltage converter can be used in a large number of applications. Therefore, this voltage converter system is particularly suitable for continuous path operation using at least four UIC voltages (1000 VAC 16⅔ Hz; 1500 VAC 50 Hz; 1500 VDC; 3000 VDC).

Therefore, this novel voltage converter system is capable of adapting to various input voltages and/or frequencies with power take-up. In addition, the control parameters can be preset to the respective nominal voltage.

For PFC analysis, a measuring element such as a shunt is associated with at least one additional reactance coil, which is coupled magnetically with the input-side reactance coil, whereby a value $I_A'$ proportional to the output current $I_A$, preferably a DC value, can be sampled at said shunt. Also in this case there is the advantage that a PFC control is possible with any input alternating voltage. Preferably, the measuring element is located in the partial system connected with the reference potential. The value $I_A'$ may also contain an AC share which occurs proportional to the input current $I_E$, i.e., representing a sinusoidal half-wave function.

Another advantage of the use of SEPIC converters in the voltage converter system introduced herein is based on the fact that the otherwise common primary storage capacitor carries out a transformation to the low-voltage side or secondary side at the rectifier output or in the intermediate circuit and is charged there by short-circuit current control. As a result, the otherwise available storage capacitor is withdrawn from the primary direct access of the input voltage. For this reason, electrolytes can be omitted at the input (high-voltage circuit), and electrolytes can be transformed into the secondary circuit (low-voltage circuit).

Due to the input-side series or parallel connection of the converters activating the isolating transformers, the converters themselves may be designed for 1/N times the total output, whereby N represents the number of partial systems that are connected in series or parallel.

Therefore, also the voltage or current per turn of the individual current isolating transformers can be correspondingly lower.

In a preferred form of embodiment the output voltage of the current-to-voltage converter system can be adjusted to various output voltages. This is achieved specifically by activating the transistor circuit breakers located in the partial systems. Also in this case it is possible to associate one primary winding on a core with several secondary windings having different numbers of turns per unit length.

In this case the transistor circuit breakers located in the partial systems can be activated over a transmitter provided on one core, thereby ensuring the time-synchronous activation of the transistor circuit breakers that are connected in series or parallel. Furthermore, the primary winding of the isolating transformer is coupled over a diode with a corresponding output of the SEPIC converter. This ensures that reverse currents of the isolating transformer do not affect the SEPIC converter negatively and that the free demagnetization of the current isolating transformer is possible.

Furthermore, the primary windings are wound on the same core and act on a secondary winding.

Furthermore, in accordance with the invention herein, a closed-loop control circuit for a current-to-voltage converter has been suggested, which comprises a voltage regulator with voltage comparator and a voltage amplifier, as well as a current regulator with current comparator and current amplifier, as well as a correction member located between the voltage regulator and the current regulator.

The closed-loop control circuit comprises a circuit for the detection of line voltage and/or line frequency, whereby this circuit is connected with a sampling circuit, which, in turn, is connected with one input to output voltage and with one output to the first input of a voltage comparator, and whereby the voltage regulator is connected on its output side with a preferably multiplying D/A converter, which, in turn, is connected with its second input with an output of the circuit and with its output side with an input of the current comparator of the current regulator.

By detecting the line voltage and the line frequency, the closed-loop control circuit can be set to different input voltages and/or frequencies. The said circuit makes corresponding control parameters available. Consequently, a PFC analysis may be performed at any input alternating voltage (amplitude, range and frequency). As an alternative, the rectified input voltage (downstream of the rectifier) may be sampled or detected.

In order to ensure an accurate detection of the line voltage and the line frequency, whereby the line voltage can also be a DC voltage, the circuit is configured as an integrated circuit, preferable as microprocessor or micro-controller. Depending on the detected mains parameters, a synthetic function with constant amplitude B (with DC input) or a pulsed sine function $B_{max}|\sin(\omega t)|$ (with AC input) may be made available in phase and synchronous to the mains input, the latter representing the actually synchronized line frequency. Then the error-amplified voltage difference $k_U \times \Delta U_A$ can be multiplied with the digital sine function available at the micro-controller output. To achieve this, the D/A converter, to which the digital sine of the circuit is supplied, follows downstream the voltage amplifier. At the output of the D/A converter a sine-modulated, error-amplified voltage can be sampled, which is available as nominal value to the downstream current-regulating circuit.

The advantage of this novel closed-loop control circuit layout is that a correction due to input voltage changes is not necessary. In particular, the correction member does not require correction as a function of the input voltage $U_E$. In addition, the actual current $I_{A1st}$ supplied to the closed-loop control circuit is independent of the fluctuations of input voltage $U_E$.

Furthermore, pre-programmed sine functions are stored in the circuit, whereby digital values can be multiplied and utilized by the D/A converter downstream the voltage converter.

Furthermore, the synthetic sine generated in the circuit is utilized as reference for continuous detection of undervoltages and overvoltages.

And, furthermore, the closed-loop control circuit comprises a comparator circuit integrated in the switching circuit, with which said comparator circuit the synthetic sine applied to the output of the switching circuit is synchronized relative to the power mains.

If the line voltage does not have zero crossings, i.e., an input voltage is concerned, the switching circuit generates a constant value B so that the closed-loop control circuit functions as DC regulating circuit and a PFC analysis does not occur in this case.

As a result of the above measures, the field of use of the voltage converter system may be expanded considerably, so that specifically in continuous path applications at least four UIC voltages (1000 VAC 16⅔ Hz, 1500 VAC 50 Hz, 1500 VDC, 3000 VDC) or 48/60/110/220 VDC and 110/234 VAC 60/50 Hz power mains can be controlled as input voltage range converters. Inasmuch as the converter or regenerator pennits very wide input voltage ranges, the problem of determining DC input voltages or AC input voltages with varying frequencies has been solved by the described method, so that all four voltage ranges plus tolerances (+/−30%) and long-term transients can be processed in one input voltage range. Also, DC input voltages having a particularly high proportion of alternating voltages can be controlled preferably without peak currents. In addition, it is possible to preset a few control parameters to the nominal voltage ($T_{On}$ time).

The method of the invention herein is distinguished in that the primary partial systems are operated with non-pulsating current and such partial systems are cascaded for the first time. These partial systems represent so-called "reactance-analyzed" topologies, which do not use pulsating current to the input. In addition, in accordance with the invention herein, the PFC analysis of the cascaded partial systems occurs in one stage on only one partial system, whereby, however, the entire system is subjected to PFC analysis.

Based on the method herein, control variables or monitoring functions do not require feedback by complex, potential-isolating measures. This is achieved in that the output current can be measured as "average" value on the primary side. In addition, the output voltage can be measured on the primary side on the primary-side transformer winding during the $T_{Off}$ time. Advantageously, the input voltage $U_E$ can be measured on the secondary side on a secondary winding during the $T_{On}$ time.

A correction of the closed-loop control circuit over the input voltage $U_E$, as has been known from prior art closed-loop control circuits, is not necessary in the case of the inventive closed-loop control circuit because the line voltage/input voltage is pre-given by the switching circuit and the value proportional to the output current is not a function of input voltage fluctuations.

Furthermore, a current-to-voltage converter in accordance with claim 25 exhibits independent inventive character. On its primary side it has substantially the layout of a partial systems of the already described cascaded current-to-voltage converter, however, on its output side it has multiple outputs with separate secondary windings which are energized through the primary winding over a joint core. Inasmuch as the isolating transformer is supplied with power, the output voltages of the multiple outputs are determined solely based on the winding ratio of the numbers of turns per unit length of the primary winding to the secondary winding. The individual currents are divided corresponding to the internal impedance of the load acting on the individual outputs. Therefore, the output voltages are constant even with changing load currents.

Also in this case the current-to-voltage converter is operated with non-pulsating current. The output values, again, can be measured on the primary side and fed to the above-described closed-loop control circuit.

As an alternative, an additional winding or a secondary winding and/or the primary winding itself may be configured as a measuring winding in order to produce signals for the closed-loop control circuit.

BRIEF DESCRIPTION OF THE DRAWINGS

Additional details, advantages and features of the invention herein—individually and/or in combination—are disclosed by the claims, as well as by the subsequent description of diagrams that refer to preferred examples of embodiment. They show:

DESCRIPTION OF THE PREFERRED EMBODIMENTS

Figure 1:
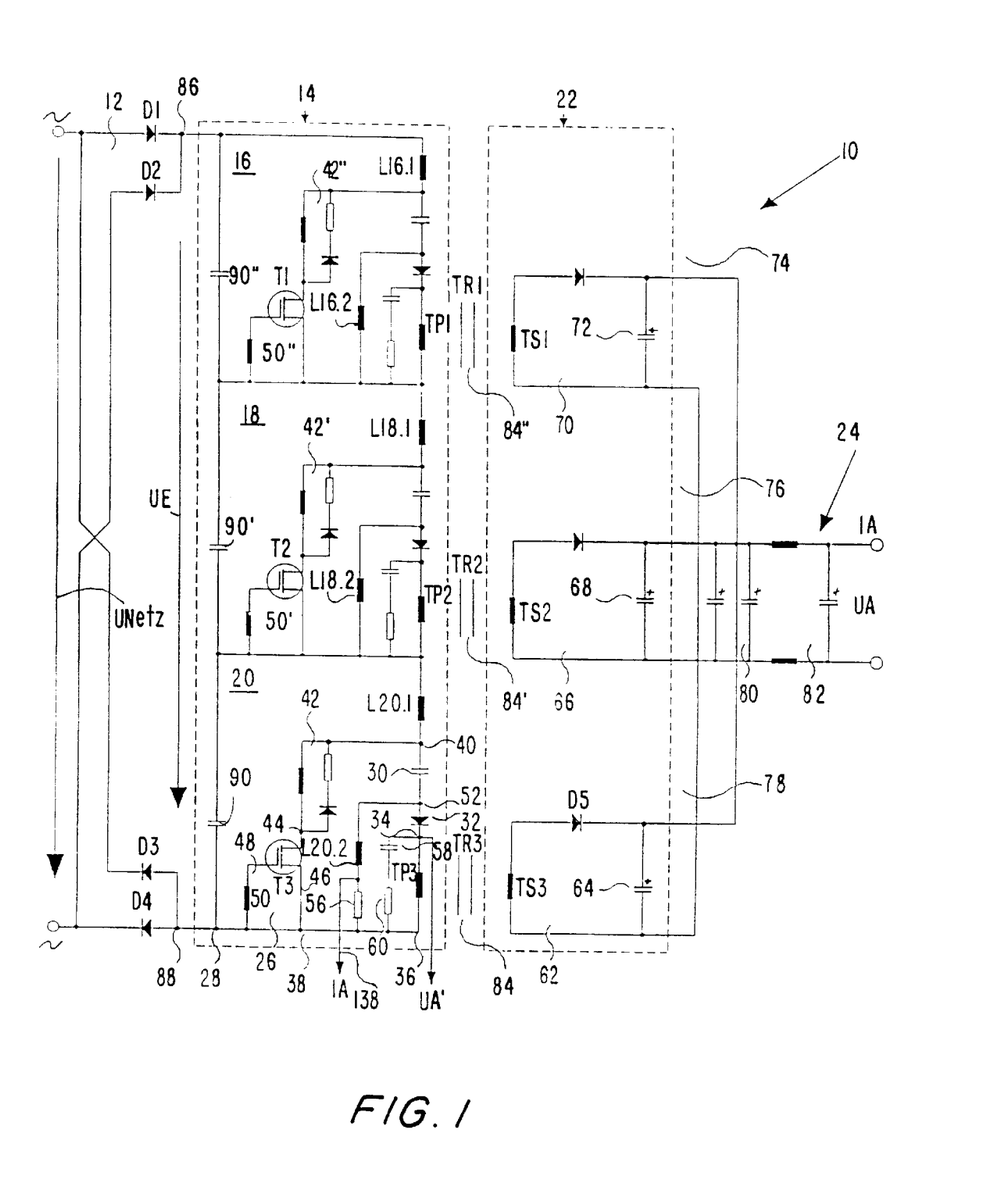
FIG. 1 a cascaded current-to-voltage converter with three primary-side serially connected partial systems, whereby these partial systems are configured as SEPIC converters, FIG. 2 a current-to-voltage converter with three primary-side parallel connected partial systems, FIG. 3 a closed-loop control circuit for at least one partial system of the voltage converter system in accordance with FIG. 1 or FIG. 9, and FIG. 4 a current-to-voltage converter with secondary-side multiple outputs.

FIG. 1 shows a current-to-voltage converter 10, which is connected to a line voltage $U^{Netz}$ over a rectifier 12 having diodes D1 through D4. In this form of embodiment line voltage $U_{Netz}$ typically ranges within 1000 and 1500 VAC and can have a frequency of 16⅔ Hz to 400 Hz. Input voltages within the range of 1500 VDC and 3000 VDC are also possible. In the example of embodiment illustrated here a sinusoidal pulsating, half-wave-shaped input alternating voltage $U_E$ is applied to the output of rectifier 12, said voltage $U_E$ being converted into a constant output voltage $U_A$ by voltage converter 10.

Current-to-voltage converter 10 has a primary side 14 including several serially connected partial systems 16, 18, 20, each including at least one transistor circuit breaker T1, T2, T3. In the example of embodiment illustrated here, partial systems 16, 18, 20 are configured as SEPIC converters or regenerators, the outputs of which are respectively connected with a primary winding TP1, TP2, TP3 of an isolating transformer TR1, TR2, TR3. Each of isolating transformers TR1, TR2, TR3 has secondary coils TS1, TS2, TS3, which are coupled into a joint load output 24 over secondary side 22 of voltage converter 10.

The design of a SEPIC converter with reference to partial system 20 is described hereinafter as example. Partial system 20 comprises a SEPIC converter 26, a primary side input 28 connected with an inductance such as an input reactance coil L20.1, which is connected over a capacitor 30 and a diode 32 with a first terminal 34 of transformer primary winding TP3. Another terminal 36 is connected with a primary-side output 38 of SEPIC converter 26. Between input-side reactance coil L20.1 and capacitor 30 is a connection point 40, which is connected with a first terminal 44 of transistor circuit breaker T3 over a series network 42. Another terminal 46 of transistor circuit breaker T3 is connected with output 38. A control input 48 of transistor circuit breaker T3 is connected with output 38 over a secondary winding of a transmitter 50. Between capacitor 30 and diode 32 is a connection point 52, which is connected with output 38 over a second reactance coil L20.2 and a resistor 56 such as a shunt. Parallel to the primary-side transformer winding TP3 is a relief network consisting of a capacitor 58 and a resistor 60 connected in series.

On the secondary side, secondary winding TS3 of transformer TR3 is connected with a peak value rectifying circuit 62 consisting of diode D5, the output of which is connected to a capacitor 64. Secondary winding TS2 is also connected on the load side with a rectifying circuit 66, the output of which is connected to a capacitor 68. The same applies to secondary winding TS1, which is connected on the load side with a rectifying circuit 70, the output of which is connected to a capacitor 72. Secondary side 22 consists substantially of three secondary systems 74, 76, 78, each consisting of respectively the secondary transformer winding, the associate rectifier and the output capacitor. Secondary systems 74, 76, 78 are electrically connected parallel and form an output 80, at which the controlled output voltage $U_A$ can be sampled over a filter network 82. Capacitors 64, 68, 72 may also be configured as a single joint capacitor with high capacity.

Preferably, the windings of the isolating transformers are located on a separate transformer core 84, 84', 84''. However, a possible alternative is to locate the windings on a joint core if the ratio of voltages to currents is suitable.

Due to the primary-side serial connection of the regenerators or SEPIC converters, which are electrically isolated, the voltage drop on one transistor circuit breaker T1, T2, T3 is reduced to one third of input voltage $U_E$. This is the reason why transistors with commercial electric strength can be used. Due to time-synchronized activation of primary-side partial systems 16, 18, 20 over transmitters 50, 50', 50'', each step is connected with one third of input voltage $U_E$. To achieve time-synchronized activation, the activation windings of transmitters 50, 50', 50'' are located on one common magnetic core. However, a possible alternative is the configuration of the activation windings as separate transformers, specifically in cases of very high input voltages.

When transistor circuit breakers T1, T2, T3 are activated, a current flows from positive pole 86 of rectifier 12 over input reactance coil L16.1 of partial system 16, a series network 42'' and transistor circuit breaker T1, as well as over input reactance coil L18.1, snubber element 42' and transistor circuit breaker T2, as well as over input reactance coil L20.1, series net element 42 and transistor circuit breaker T3 to negative pole 88 of the rectifier. Inasmuch as the current through input reactance coils L20.1, L18.1 and L16.1 is identical—the same reactance coil inductances and synchronous activation of transformer switch elements T1, T2, T3 provided—the same voltage drop will occur on each reactance coil L16.1, L18.1, L20.1, as a result of which an equal voltage drop is set on transistor circuit breakers T1, T2, T3.

If the input is DC, capacitors 90, 90', 90'' are parallel to the inputs of the respective partial systems 16, 18, 20, whereby respectively only ⅓ of the input voltage $U_E$ drops at each capacitor. In the present case, the usually very large storage capacitor is withdrawn from the primary direct access of the input voltage and transformed to the low-voltage or the secondary side and charged there by short-circuit current.

Figure 2:
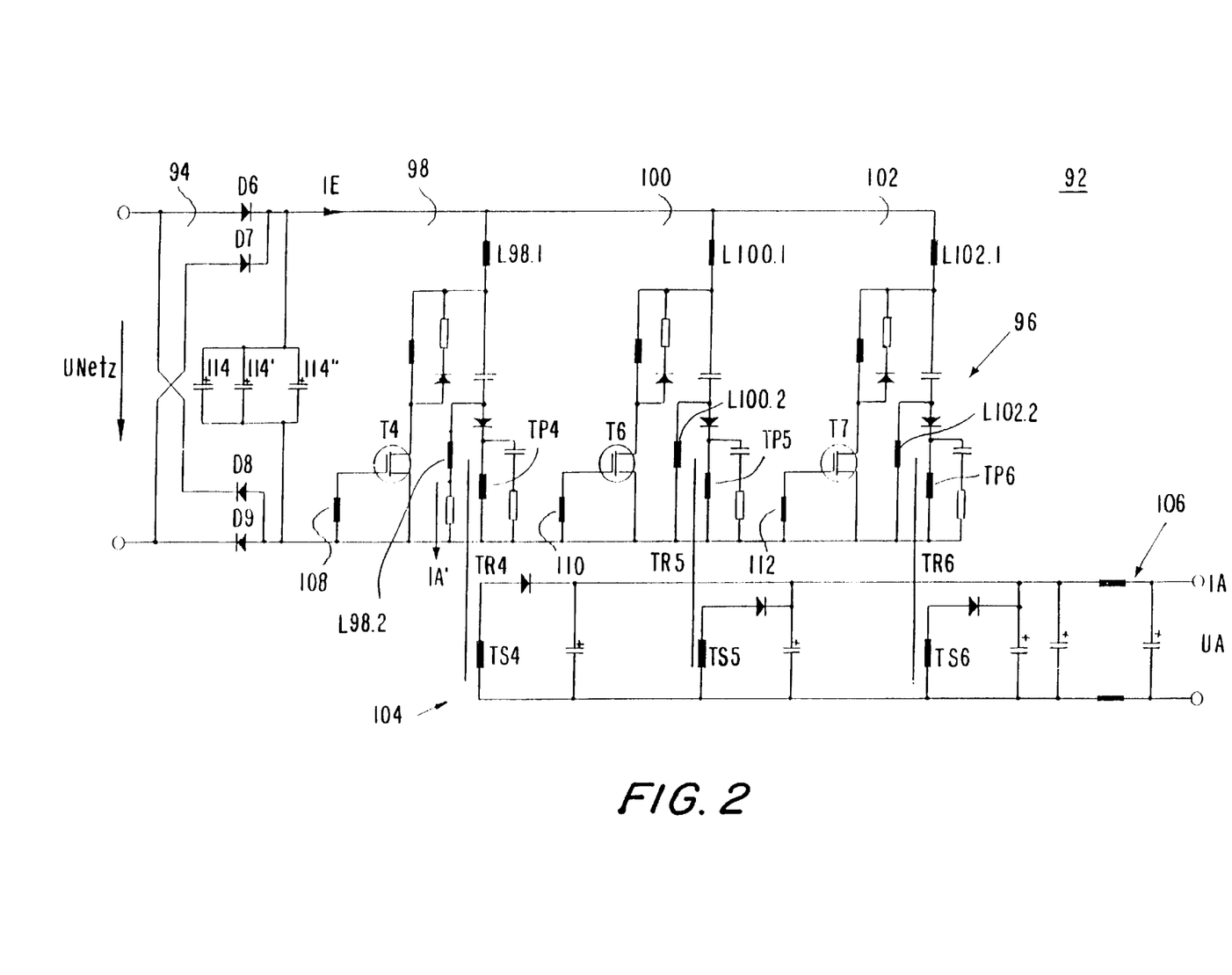

FIG. 2 shows a current-to-voltage converter 92 which is connected over a rectifier 94 with diodes D6 through D9 to line voltage $U_{Netz}$. In this example of embodiment the line voltage $U_{Netz}$ typically is within the range of 110–234 VAC or 28–48 VAC and can have a frequency of 16⅔ Hz–400 Hz. Line voltages within the range of 4–72 or 14.4–154 VDC are also possible. Current-to-voltage converter 92 is designed specifically for high input currents $I_E$ or output currents $I_A$.

Current-to-voltage converter 92 has a primary side 96 including several parallel connected partial systems 98, 100, 102, each including at least one transistor circuit breaker T4, T6, T7. In the example of embodiment shown here, partial systems 98, 100, 102 are configured as SEPIC converters or regenerators, the outputs of which are connected with respectively one primary winding TP4, TP5, TP6 of an isolating transformer TR4, TR5, TR6. Each of isolating transformers TR4, TR5, TR6 has secondary coils TS4, TS5, TS6, which are coupled over a secondary side 104 of current-to-voltage 92 into a joint load output 106.

Figure 3:
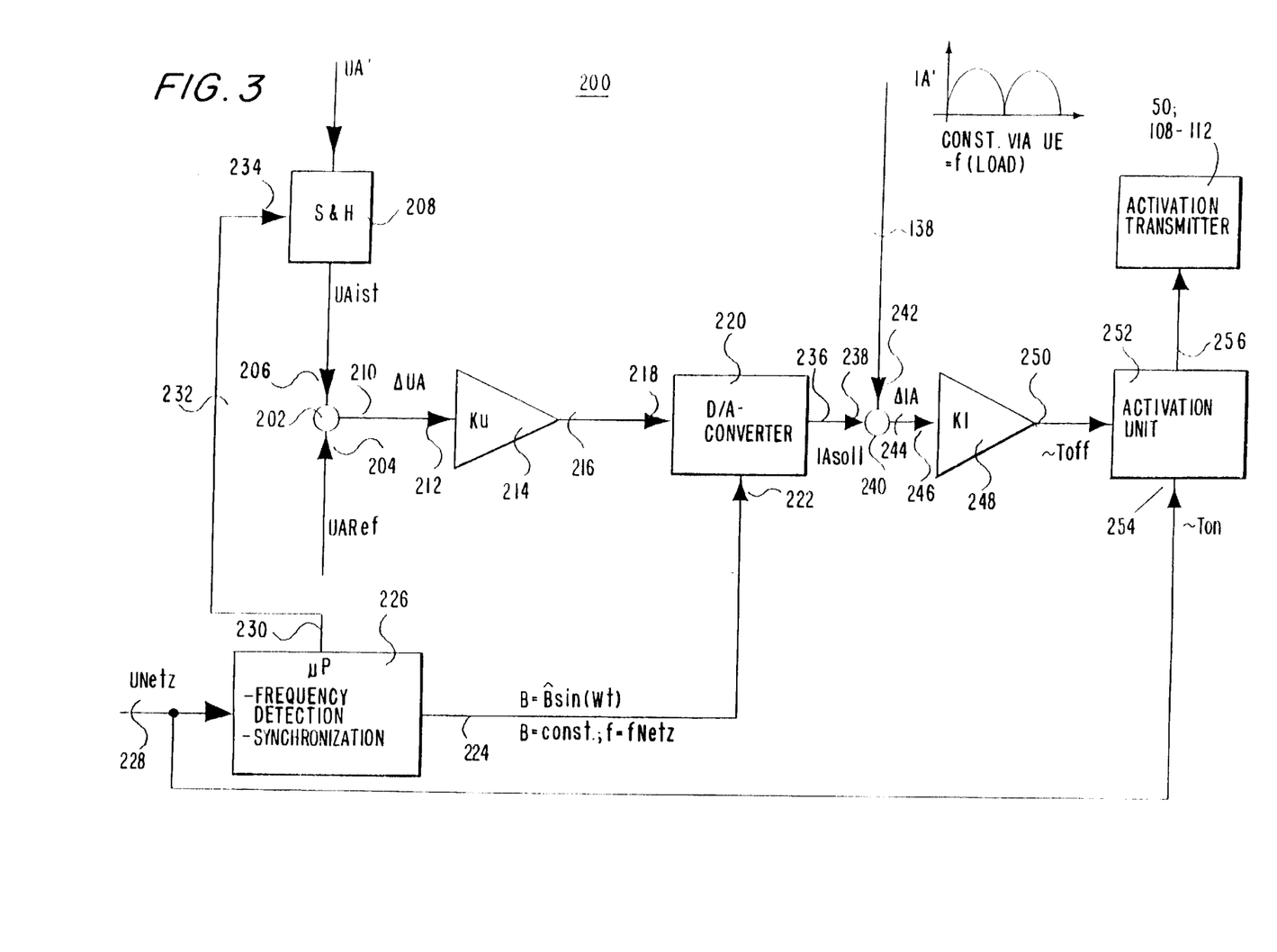

The layout of partial systems 98, 100, 102 corresponds substantially to that of partial systems 16, 18, 20, which have been described in detail with reference to FIG. 1. As a result of the primary-side parallel connection of the electrically isolated regenerators or SEPIC converters 98, 100, 102 the current flowing through a transistor circuit breaker T4, T5, T6 is reduced to one third of input current $I_E$. This is the reason why transistors with commercial electric strength can be used. Due to time-synchronized activation of primary-side partial systems 98, 100, 102 by activation transmitters 108, 110, 112 one third of input current $I_E$ flows through each step. To achieve time-synchronized activation, activation transmitters 108, 110, 112 of the parallel circuit described here are located on one common core. Activation transmitters 108, 110, 112 can also be configured as electronic semiconductor power drivers (not illustrated). Partial systems 98, 100, 102 have input-side inductances L98.1, L100.1, L102.1, which, over the transistor circuit breakers, are connected parallel to input voltage $U_E$ at least temporarily and therefore have a current-balancing effect on the entire system. FIG. 3 shows the closed-loop control circuit which is used to explain how the current-to-voltage converter is controlled.

FIG. 3 shows the closed-loop control circuit for activation of a partial system 16, 18, 20 or 98, 100, 102 of current-to-voltage regulator 10 or 92 in accordance with FIG. 1 or 2, respectively. Closed-loop control circuit 200 has an input-side voltage comparator 202, the first input 204 of which is connected with reference voltage $U_{ARef}$ and the second input 206 of which is connected over a sampling circuit 208 such as a sample-and-hold circuit or continuous measurement, with output voltage $U_A$ for sampling an actual voltage $U_{A1St}$. Output voltage UA is measured over a not-illustrated measuring element on output 24 of the current-to-voltage converter or over load voltage $U_A'$ on primary transformer winding TP1 through TP6 during the $T_{OFF}$ phase.

An output 210 of comparator 202 is connected with an input 212 of an amplifier 214 in order to amplify an error voltage $\Delta U_A$ resulting from actual voltage $U_{A1st}$ and reference voltage $U_{ARef}$. To an output 216 of amplifier 214 an error-amplified voltage $K_U \times \Delta U_A$ is connected, said voltage being applied to an input 218 of a multiplying D/A converter 220. Another input 222 of D/A converter 220 is connected with an output 224 of a switching circuit, preferably micro-controller 226. Micro-controller 226, in turn, is connected over lead 228 with a power line or line voltage $U_{Netz}$. Furthermore, micro-controller 226 is connected over output 230 and a trigger line 232 with an input 234 of sampling circuit 208.

An output 236 of D/A converter 220, to which a nominal current $I_{ASoll}$ is applied, is connected with an input 238 of a comparator 240. Another input 242 of comparator 240 is connected over lead 138 with shunt 56 in the branch of reactance coil 220.1 for sampling a value $I_A'$ which is proportional to output current $I_A$. An output 244 of the comparator is connected with an input 246 of a current amplifier 248. An output 250 of the amplifier is connected to an amplified error current $K_I \times \Delta I_A$, which is fed to an activation unit 252 and forms a control variable. The activation unit also comprises an input 254 for the line or input voltage for $T_{ON}$ control, as well as an output 256 for activation of transistor circuit breaker T1 or T6 over activation transmitter 50, 50', 50" or 108 through 112. The value $K_I \times \Delta I_A$ is used for control of the $T_{Off}$ time of transistor circuit breakers T1–T6. Even without U/I controller, a quasi-constant output voltage with sinusoidal current take-up with alternating power supply and varying input range or output load is achieved by means of $T_{ON}$ control and preset $T_{OFF}$ voltage as DC value.

Over input line 228, micro-controller 226 detects input line voltage $U_{Netz}$, as well as line frequency $f_{Netz}$. If line voltage is direct voltage, frequency $f_{Netz}=0$ is detected. Any frequency may be detected, preferably f=16⅔, 50 or 60 Hz. Based on the detected line frequency, a synthetic, ideally pulsating (rectified) sine function is stored and generated in micro-controller 120, whereby this sine function is synchronized with the line frequency and has a constant amplitude $B_{max}$.

After detection and storage of the time base, processing begins with a trigger/zero crossing, and synchronization occurs during additional zero crossings. Synchronization pulses between mathematical zero crossings are gated because of possible interferences.

Over output 224, the generated sine curve is fed to input 226 of D/A converter 220. When a synchronization pulse, which is available for each half-period zero crossing, is present, sampling circuit 208 is triggered. Now the error-amplified voltage error voltage $K_U \times \Delta U_A$ is multiplied with the synthetic sine curve $B_{max} \times |\sin(\omega t)|$, which is in phase with line voltage, in D/A converter 220. Therefore, a sine-analyzed voltage-error-amplified value is at the output, whereby this amplified value is available as nominal current $I_{ASoll}$ for the activation of transistor circuit breakers T1–T6.

As opposed to known closed-loop circuits, an additional correction member is not required because a value is available due to the measurement of the output current in the primary-side reactance coil branch, said value being independent of long-term fluctuations of input voltage $U_E$, but follows the waveform of the nominal frequency (PFC).

Inasmuch as the sine function is generated by the micro-controller, it may also be used as reference for undervoltage and overvoltage detection. The sine function generated by the micro-controller can be synchronized to mains by means of a comparator circuit. If micro-controller 226 detects that the input voltage is a direct voltage, a constant voltage B is output at output 224 so that PFC analysis is not necessary.

Concerning the output voltage actual value $U_{A1st}$, it should be mentioned that it is sampled by the trigger of the sine zero crossing, stored in sample-and-hold circuit 208 and compared with reference value $U_{ARef}$.

The described system comprising current-to-voltage converter 10, 92 and inventive closed-loop control circuit 200 is used in particular in continuous path operation using at least four UIC voltages as, for example, 1000 VAC 16⅔ Hz, 1500 VAC 50 Hz; 1500 VDC and 3000 VDC. Inasmuch as the voltage converter or regulator permits a wide input voltage range, the problem of determining input alternating voltage or input direct voltage or frequency of input alternating voltage has been solved by the described method. All four ranges and tolerances (+/−30%) and long-term transients can be processed in one input voltage range.

Figure 4:
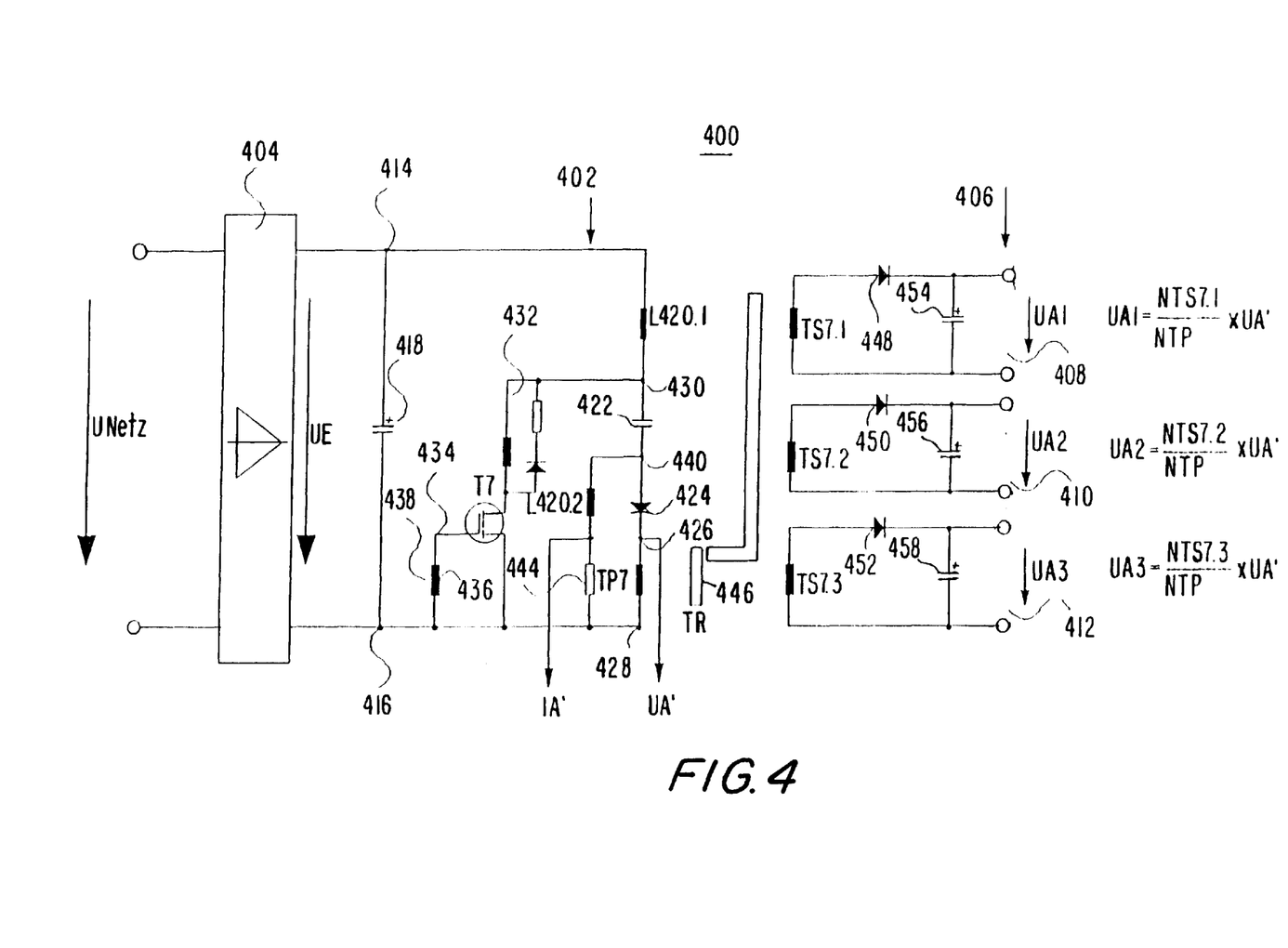

FIG. 4 shows a current-to-voltage converter 400 with independent inventive characteristics. Current-to-voltage converter 400 has a primary side 402, which is connected over a rectifier 404 to line voltage $U_{Netz}$, and a secondary side 406, which has several, i.e., multiple, preferably three outputs 408, 410, 412 with output voltages $U_{A1}$, $U_{A2}$, $U_{A3}$.

Connected parallel to output terminals 414, 416 of rectifier 404 is a capacitor 418, to which is applied an input voltage $U_E$ for current-to-voltage converter 400. Terminal 414 is connected with a primary inductance such as reactance coil L420.1, which is connected over a capacitor 422 and a diode 424 with a first terminal 426 of a primary-side winding TP7 of an isolating transformer TR. One terminal 428 of primary-side winding TP7 is connected with input terminal 416 of rectifier 404. Between reactance coil L420.1 and capacitor 422 is a connecting point 430, which is connected over a snubber network 432 and a transistor circuit breaker T7 with terminal 416. A control terminal 434 of transistor circuit breaker T7 is connected over a secondary winding 436 of an activation transmitter 438 with terminal 416.

A connecting point 440 located between capacitor 422 and diode 424 is connected over a second inductance such as reactance coil L420.2 and a serially connected measuring element such as shunt 444 with clamp 416 as well. The secondary-side multiple outputs 408, 410, 412 each have a secondary winding TS7.1, TS7.2, TS7.3 that are located, together with primary winding TP7, on a joint core 446. Secondary windings TS7.1, TS7.2, TS7.3 are connected over a rectifier diode 448, 450, 452 with an output capacitor 454, 456, 458, to which output voltages $U_{A1}$, $U_{A2}$ and $U_{A3}$ are applied.

The closed-loop control circuit described in conjunction with FIG. 3 can be used for control of current-to-voltage converter 400. Also current-to-voltage converter 400 is characterized in that feedback of control variables or monitoring functions of secondary-side values is not necessary. This is possible in particular in that the output voltage can be measured on the primary side during the $T_{Off}$ time at terminal 426 of primary winding TP7 and the output current (average value) on the primary side at measuring element 440. During the $T_{On}$ time the input voltage can be measured on the secondary side.

What is claimed is:

1. Current-to-voltage converter (400) comprising an input (414), to which is applied a first inductance (L420.1) connected—over a capacitor (422) and a diode (424)—with an isolation transformer (TR) in connection with a first connection (426) of a primary winding (TP7), whereby said isolation transformer's second connection (428) is connected with a first output (416), in which case a connecting point (430) between the first inductance (L420.1) and the capacitor (422) is connected over a circuit breaker (T7) with the output (416), and a connecting point (440) between the capacitor (422) and the diode (424) is connected over a series circuit comprising a second inductance (420.2) and a measuring element (444) with the output (416), wherein the isolating transformer (TR) comprises several secondary windings (TS7.1, TS7.2, TS7.3) on one core (446) in order to form multiple outputs.

2. Current-to-voltage converter in accordance with claim 1, wherein the current-to-voltage converter (400) is operated with non-pulsating current.

3. Current-to-voltage converter in accordance with claim 1, wherein a value $U_A'$ proportional to one of the output voltages $U_{A1}$, $U_{A2}$, $U_{A3}$ can be sampled on the primary transformer winding (TP7).

4. Current-to-voltage converter in accordance with claim 1, wherein a value $I_A'$ proportional to the output currents $I_{A1}$, $I_{A2}$, $I_{A3}$ can be measured on the measuring element (444) such as a shunt connected in series with the second inductance (L420.2).

5. Current-to-voltage converter in accordance with claim 1, wherein the secondary windings (TS7.1, TS7.2, TS7.3) have different numbers of turns per unit length for the adjustment of different output voltages $U_{A1}$, $U_{A2}$, $U_{A3}$.

6. Current-to-voltage converter in accordance with claim 1, wherein the output voltages $U_{A1}$, $U_{A2}$, $U_{A3}$ are constant.

7. Current-to-voltage converter in accordance with claim 1, wherein an additional winding or a secondary winding and/or the primary winding itself are configured as a measuring winding and make the controlled variable for available to a closed-loop-circuit.

* * * * *